(12) United States Patent
Blair et al.

(10) Patent No.: US 7,647,499 B2
(45) Date of Patent: Jan. 12, 2010

(54) APPARATUS AND METHOD FOR OWNERSHIP VERIFICATION

(75) Inventors: Colin Blair, Westleigh (AU); Kevin Chan, Ryde (AU); Alexander Quentin Forbes, Westleigh (AU); Christopher Reon Gentle, Gladesville (AU); Neil Hepworth, Artarmon (AU); Andrew W. Lang, Epping (AU); Paul Roller Michaelis, Louisville, CO (US)

(73) Assignee: Avaya Inc, Basking Ridge, NJ (US)

( * ) Notice: Subject to any disclaimer, the term of this patent is extended or adjusted under 35 U.S.C. 154(b) by 723 days.

(21) Appl. No.: 11/088,398

(22) Filed: Mar. 24, 2005

(65) Prior Publication Data

US 2006/0218648 A1    Sep. 28, 2006

(51) Int. Cl.
*H04L 9/32* (2006.01)
*G06F 7/04* (2006.01)
(52) U.S. Cl. .................... 713/168; 713/179; 726/27
(58) Field of Classification Search .............. 726/27; 713/168, 179; 340/5.2, 5.61, 5.64, 572.1
See application file for complete search history.

(56) References Cited

U.S. PATENT DOCUMENTS 4,688,026 A    8/1987    Scribner et al.

| | | |
|---|---|---|
| 2002/0038267 A1 | 3/2002 | Can et al. |
| 2005/0037718 A1* | 2/2005 | Kim et al. ................. 455/101 |
| 2005/0038718 A1 | 2/2005 | Barnes et al. |
| 2005/0108044 A1* | 5/2005 | Koster .......................... 705/2 |
| 2006/0169771 A1* | 8/2006 | Brookner ................... 235/382 |

FOREIGN PATENT DOCUMENTS

EP    1501034 A1    1/2005

OTHER PUBLICATIONS

European Search Report for corresponding European patent application.

* cited by examiner

*Primary Examiner*—Matthew B Smithers
*Assistant Examiner*—Ali S Abyaneh
(74) *Attorney, Agent, or Firm*—John C. Moran

(57) ABSTRACT

A method and apparatus identifying an item by attaching a radio frequency identification device to the item; obtaining encryption information; generating an encrypted code from the encryption information by a programmer; inserting the encrypted code into the radio frequency identification device by the programmer whereas the encrypted code may be one of a plurality of encrypted codes; attempting to access the radio frequency identification device by a security reader by transmission of another encrypted code to the radio frequency identification device; and responding with a correct access signal by the radio frequency identification device in response to receipt of the other encrypted code if the other encrypted code is same as the inserted encrypted code.

18 Claims, 7 Drawing Sheets

APPARATUS AND METHOD FOR OWNERSHIP VERIFICATION

TECHNICAL FIELD

The invention relates to the utilization of radio frequency identification devices.

BACKGROUND OF THE INVENTION

It is known to utilize RFIDs to prevent theft of products by determining if the products have been purchased. Another use of RFIDs is to determine the inventory within a store. In addition, RFIDs have been utilized for purchasing products. One such system for this is the digital signature transponder (DST) manufactured by Texas Instruments™ that has been utilized to allow the automatic purchasing of gasoline. Such devices as the digital signal signature transponder have also been utilized for the payment of tolls on toll roads. In addition, RFIDs have been utilized in automobile keys to prevent the unauthorized starting of an automobile unless circuitry within the automobile receives the proper signal from a RFID located within the key.

However, the problem remains to prevent theft by not only determining that an article may have been purchased but also that the person possessing the article is the owner of the article.

Another problem remains to prevent theft whereby the article or product has been properly purchased by an organization such as a corporation and may be stolen by an employee who is not authorized to leave the premises of the organization with the item.

SUMMARY OF THE INVENTION

A method and apparatus identifying an item by attaching a radio frequency identification device to the item; obtaining encryption information; generating an encrypted code from the encryption information by a programmer; inserting the encrypted code into the radio frequency identification device by the programmer whereas the encrypted code may be one of a plurality of encrypted codes; attempting to access the radio frequency identification device by a security reader by transmission of another encrypted code to the radio frequency identification device; and responding with a correct access signal by the radio frequency identification device in response to receipt of the other encrypted code if the other encrypted code is same as the inserted encrypted code.

DETAILED DESCRIPTION

Figure 1:
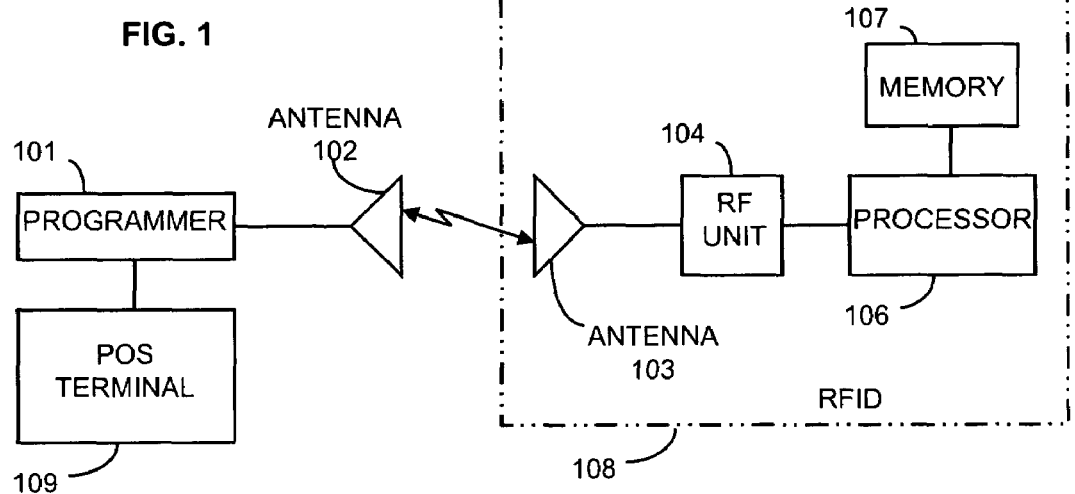
FIG. 1 illustrates, in block diagram form, an embodiment in which a programmer interconnected to a point of sales terminal remotely programming a RFID.

In FIG. 1, radio frequency identification device (RFID) 108 is attached to a physical item. The physical item can be a number of things, for example, it may be clothing, food, instruments, etc. FIG. 1 illustrates the operations of an embodiment where the item to which RFID 108 is attached is being purchased. Upon being purchased, point of sale (POS) terminal 109 transfers the information that will be utilized to derive an encrypted key to programmer 101. In response, programmer 101 encrypts the information being received from POS terminal 109 into an encrypted code. The encrypted code then is transferred to RFID 108 via antennae 102 and 103. After processor 106 receives the encrypted code from RF unit 104, processor 106 stores the encrypted code into memory 107.

In another embodiment, RFID 108 may already have information concerning the physical item stored in memory 107. For example, this information may consist of the product type. In still another embodiment, programmer 101 writes a plurality of encrypted codes into RFID 108. As will be described with respect to FIG. 2, the encrypted codes may contain secure information intended for immediate or short term use as well as encrypted information that is intended for long term use. For example, the encrypted code may contain information for short term use, such as the sales receipt number, store identification, date and approximate time of purchase, purchaser's name and age, etc. The long term information that may be placed in an encrypted code and stored in memory 107 may include biological data such as finger prints, credit card number utilized to purchase the item, social security number of the purchaser, driver's license number of the purchaser, etc. In addition, the information intended for the long term encrypted code may also be the purchaser's name, age, and approximate time of purchase. In addition, other private information may be stored in RFID by programmer 101 such as personal identification, etc.

RFID 108 does not respond to inquiries concerning information stored in memory 107 except when a stored encrypted code is received. However, in one embodiment RFID 108 may send false information to an inquiring reader in the absence of a stored encrypted code. In yet another embodiment, RFID 108 may transmit public information such as product type when being interrogated by a reader that has not supplied a stored encrypted code. Also, private information may be stored in memory 107 by programmer 101 that may only be released upon a stored encrypted code being received by processor 106. Such additional information could be, for example, the date of purchase of the item and whether the item is under warranty. In one embodiment, a programmer, such as programmer 101, could later modify the data stored in memory 107 by first transmitting the stored encrypted code to gain access to RFID 108. The later stored data could be used to indicate a different owner. This operation could be useful when the original owner sells the item to which RFID 108 is attached, to another person. In another embodiment, ownership linked to a warranty could be protected or not protected against later change. The ownership linked to warranty could be protected when the warranty is only valid for the original owner.

Figure 2:
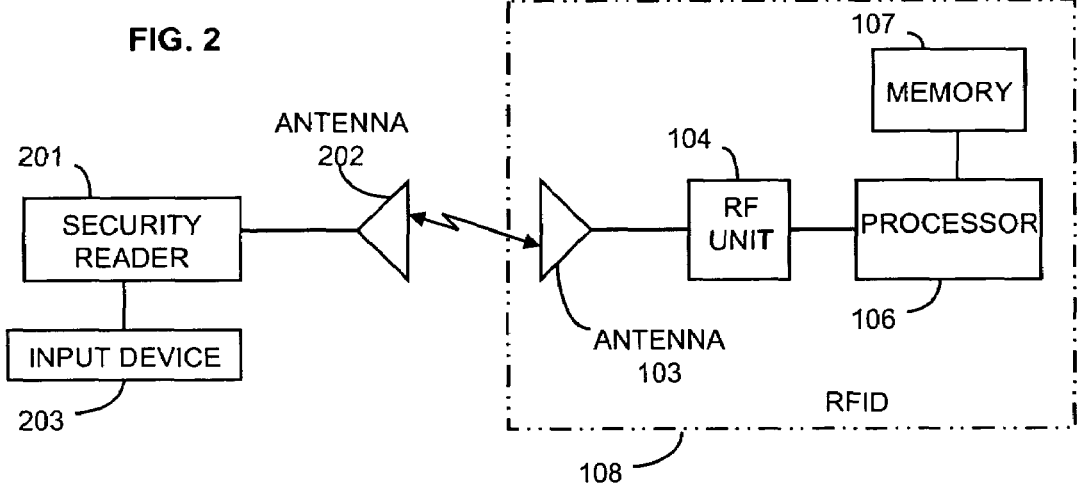
FIG. 2 illustrates, in block diagram form, an embodiment of a security reader reading the information stored in a RFID.

FIG. 2 illustrates a security reader that is capable of reading the encrypted and private information from RFID 108 that is stored in memory 107 by transmitting a stored encrypted code to RFID 108. Security reader 201 could, for example, be utilized by a security guard in a shopping mall to verify that the individual in possession of a particular item is indeed the owner of the item. It is envisioned that the security guard would be concerned only about the encrypted codes that had been stored for immediate or short term use. Another utilization of security reader 201 may be by a pawn shop or police to verify the ownership of an item some time after the purchase of the item. It is anticipated that the encrypted code utilized for this purpose would be the encrypted code previously described for long term use.

Security reader 201 receives the information that had been used to generate an encrypted code that is presently stored in memory 107 from input device 203. For example, if this is a credit card number, then security reader 201 takes the credit card number received by input device 203, encrypts this number into an encrypted code, and transmits this encrypted code via antenna 202, antenna 103, and RF unit 104 to processor 106. Processor 106 then searches memory 107 to determine if the received encrypted code matches a stored encrypted code. If there is a match of the encrypted codes, processor 106 signifies this fact to security reader 201. In addition, processor 106 may transmit to security reader 201 any previously stored private information such as the date of purchase and warranty information. In addition, the private information may consist of the purchaser's name.

Figure 3:
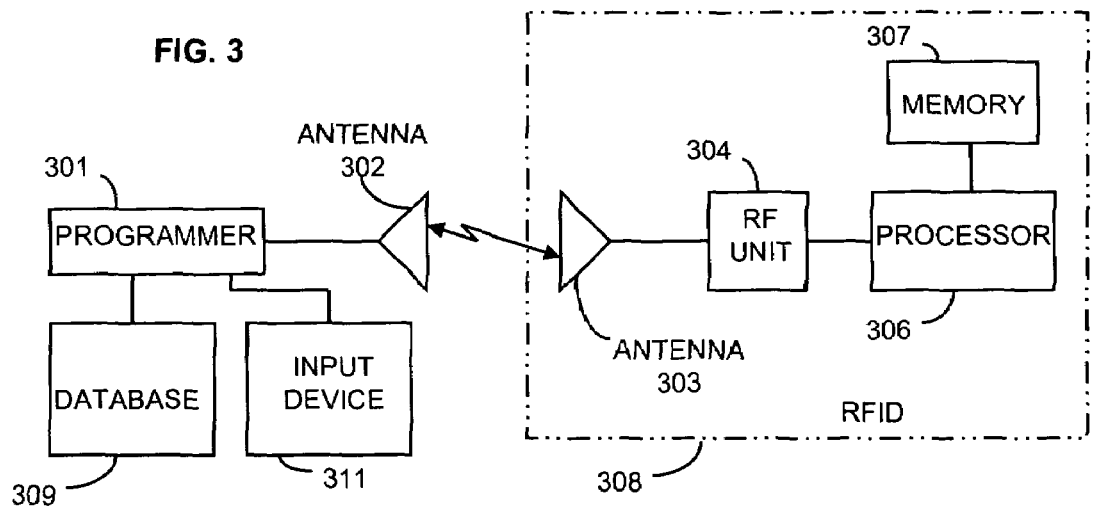
FIG. 3 illustrates, in block diagram form, another embodiment of a programmer interconnected to a database remotely programming a RFID.
Figure 4:
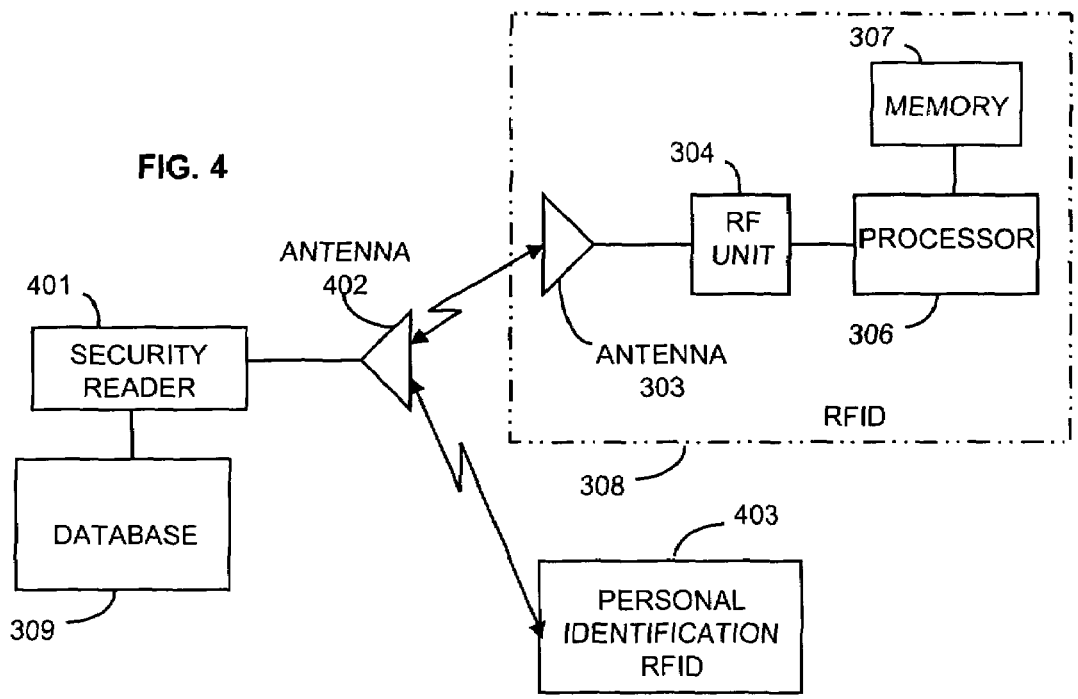
FIG. 4 illustrates, in block diagram form, another embodiment of a security reader reading information stored in an item RFID and a personal identification RFID.

FIGS. 3 and 4 illustrate, in block diagram form, embodiments to prevent the theft of an item from the premises of an organization. The most common items that are taken in and out of the premises of an organization are normally personal to one individual of that organization. For example, items of this type include laptop computers, personal digital assistants, wireless telephones, etc. When an item of this type leaves the premises, it is important to establish that it is being taken out by the individual assigned to the item. The embodiments illustrated in FIGS. 3 and 4 accomplish this.

Each individual of the organization is given a personal identification RFID normally in the form of an employee badge or a separate identification card in addition to or in lieu of an employee badge. When a new item is acquired by an individual, programmer 301 of FIG. 3 programs the RFID that is attached to the item or that will be attached to the item. This RFID is designated as RFID 308. Programmer 301 may utilize information in database 309 as well as information from input device 311 to generate one or more encrypted codes. In another embodiment, programmer 301 first reads the individual identification from the personal identification RFID 403. In other embodiments, the information that is to be utilized for an encrypted code to be stored in RFID 308 may be obtained from database 309 or input device 311.

The information utilized by programmer 301 must also be present in personal identification RFID 403 assigned to the individual who is also assigned the item in question. Programmer 301 utilizes the information to generate an encrypted code and transmits this encrypted code to processor 306 via antennae 302 and 303 and RF unit 304. Processor 306 is responsive to the encrypted code to store this code in memory 307. Memory 307 may also store public information identifying the item by its serial number or another identification code.

When an individual attempts to leave the premises of the organization, security reader 401 stationed at an exit from the premises detects the presence of personal identification RFID 403 and RFID 308. Security reader 401 accesses personal identification RFID 403 and obtains the information that had been previously utilized by programmer 301 to generate the encrypted code stored in memory 307 in FIG. 3. Security reader 401 generates the encrypted code and transmits this encrypted code to processor 306 via antennae 402 and 303 and RF unit 304. Note, if an individual is not in possession of any item having a property RFID, the individual may or may not have to have a personal RFID to exit the premises.

Processor 306 searches memory 307 with the received encrypted code to determine if there is a stored encrypted code that matches the received encrypted code. If the answer is yes, processor 306 transmits a signal to security reader 401 indicating that the item is in the possession of the proper individual. If processor 306 does not find a match, it transmits a signal to security reader 401 indicating that the item is not in the possession of the proper individual. In response to the latter signal, security reader 401 may sound an alarm and/or lock the exit so that the individual can not exit the premises.

Figure 5:
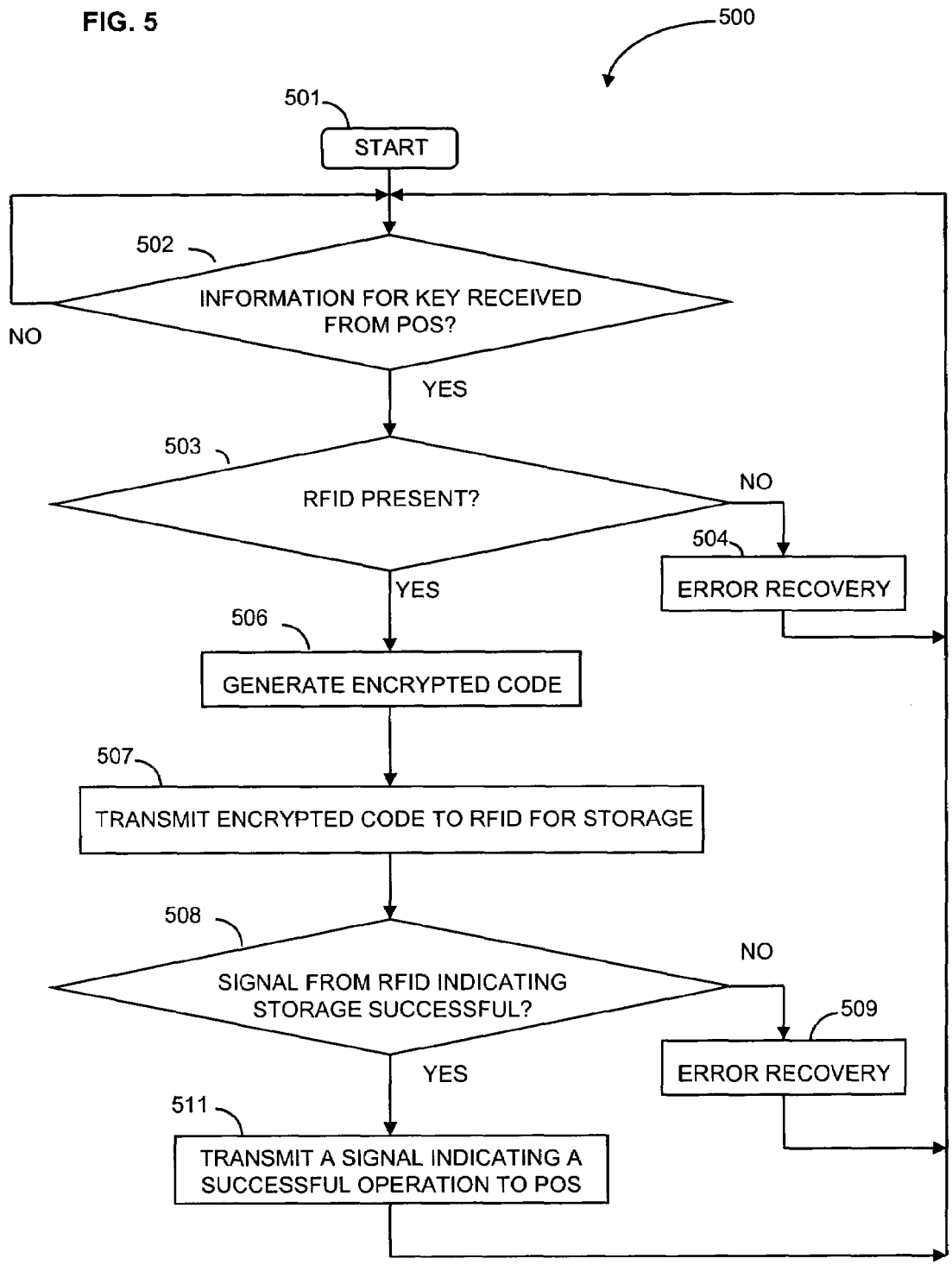
FIG. 5 illustrates, in flowchart form, operations performed by the programmer of the embodiment of FIG. 1.

FIG. 5 illustrates operations 500 that are performed by one embodiment of a programmer of FIG. 1. After being started in block 501, decision block 502 determines if a key has been received for encrypting a code to be stored in a RFID from the POS. Note, that there may be additional commands to instigate the operations of the programmer. If the answer is no, control is transferred back to decision block 502. If the answer is yes, decision block 503 determines if there is a RFID present into which an encrypted code can be stored. If the answer is no, block 504 performs error recovery before transferring control back to decision block 502.

If the answer is yes in decision block 503, block 506 generates the encrypted code from the key received from the POS, and block 507 transmits the encrypted code to the RFID for storage before transferring control to decision block 508.

Decision block 508 determines if a signal has been received from the RFID indicating that the storage of the encrypted code was successful. Note, that more than one encrypted code may be generated and transmitted for storage in the RFID. Decision block 508 determines if all of the encrypted codes have been stored successfully. If the answer in decision block 508 is no, block 509 performs error recovery before transmitting control back to decision block 502. If the answer in decision block 508 is yes, block 511 transmits a signal indicating a successful operation to the POS before transferring control back to decision block 502.

Figure 6:
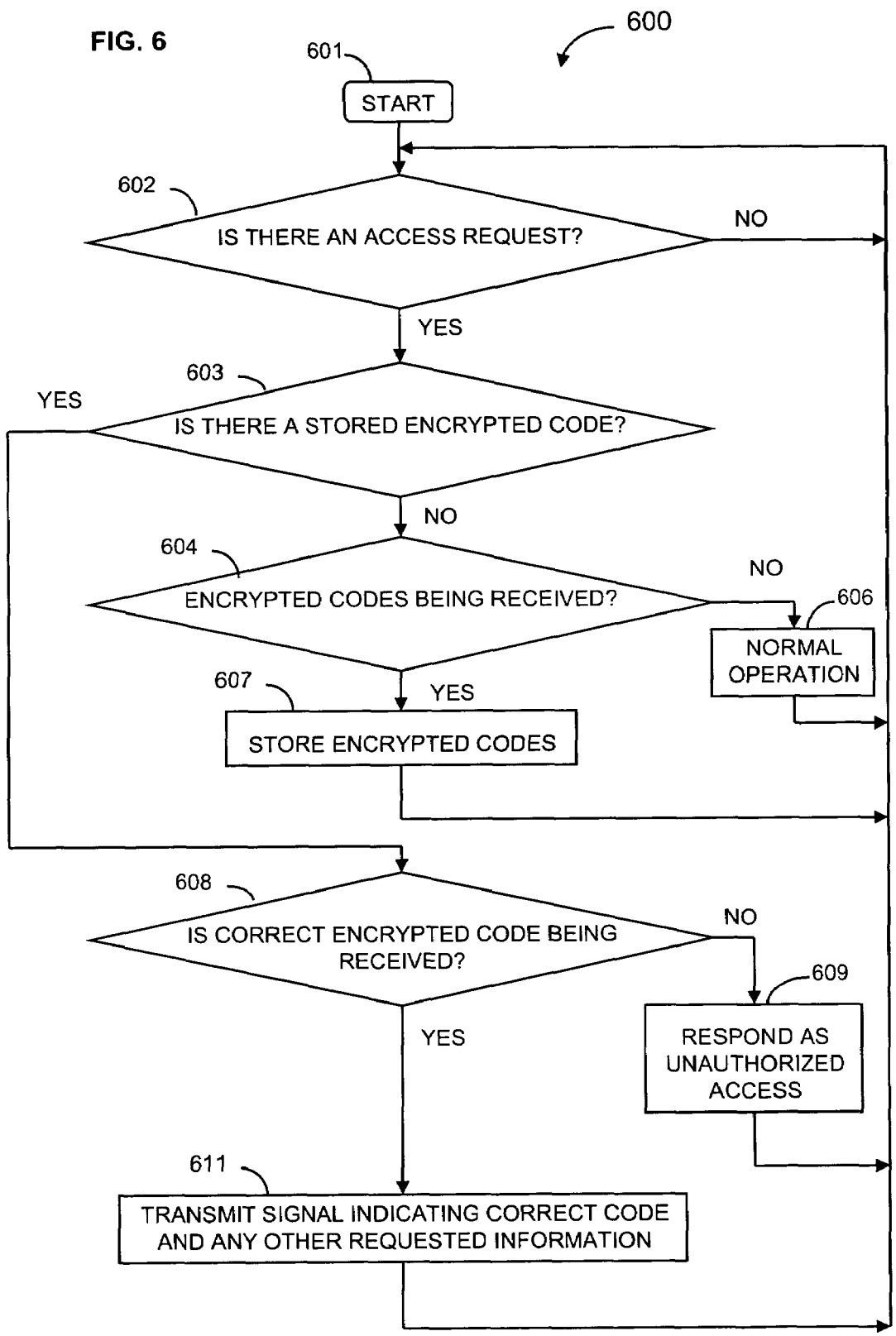
FIG. 6 illustrates, in flowchart form, operations performed by an RFID in the embodiments illustrated in FIGS. 1 and 2.

FIG. 6 illustrates operations 600 that are performed by a RFID during programming and accessing. After being started in block 601, decision block 602 determines if there is an access request being received for obtaining data from the RFID. If the answer is no, control is transferred back to decision block 602. If the answer is yes in decision block 602, decision block 603 determines if there is a stored encrypted code in the RFID. There may be multiple encrypted codes stored in the RFID; however, one encrypted code is sufficient.

If the answer is yes in decision block 603, control is transferred to decision block 608. If the answer is no in decision block 603, decision block 604 determines if encrypted codes are being received. If the answer is no, block 606 performs normal operations before transferring control back to decision block 602. If the answer is yes in decision block 604, block 607 stores the encrypted codes and transfers control back to decision block 602.

Returning to decision block 603, if the answer in decision block 603 is yes, decision block 608 determines if the correct encrypted code is being received. If the answer is no, block 609 responds as an unauthorized access. The response of block 609 may be to transmit nothing back to the reader accessing the RFID, transmit back only public information stored in the RFID to the reader, or transmit false information to the reader. After execution of block 609, control is transferred back to decision block 602. If the answer is yes in decision block 608, block 611 transmits a signal indicating that the correct code has been received and may also transmit any other requested information or information to be transmitted when a correct code is received. After execution of block 611, control is transferred back to decision block 602.

Figure 7:
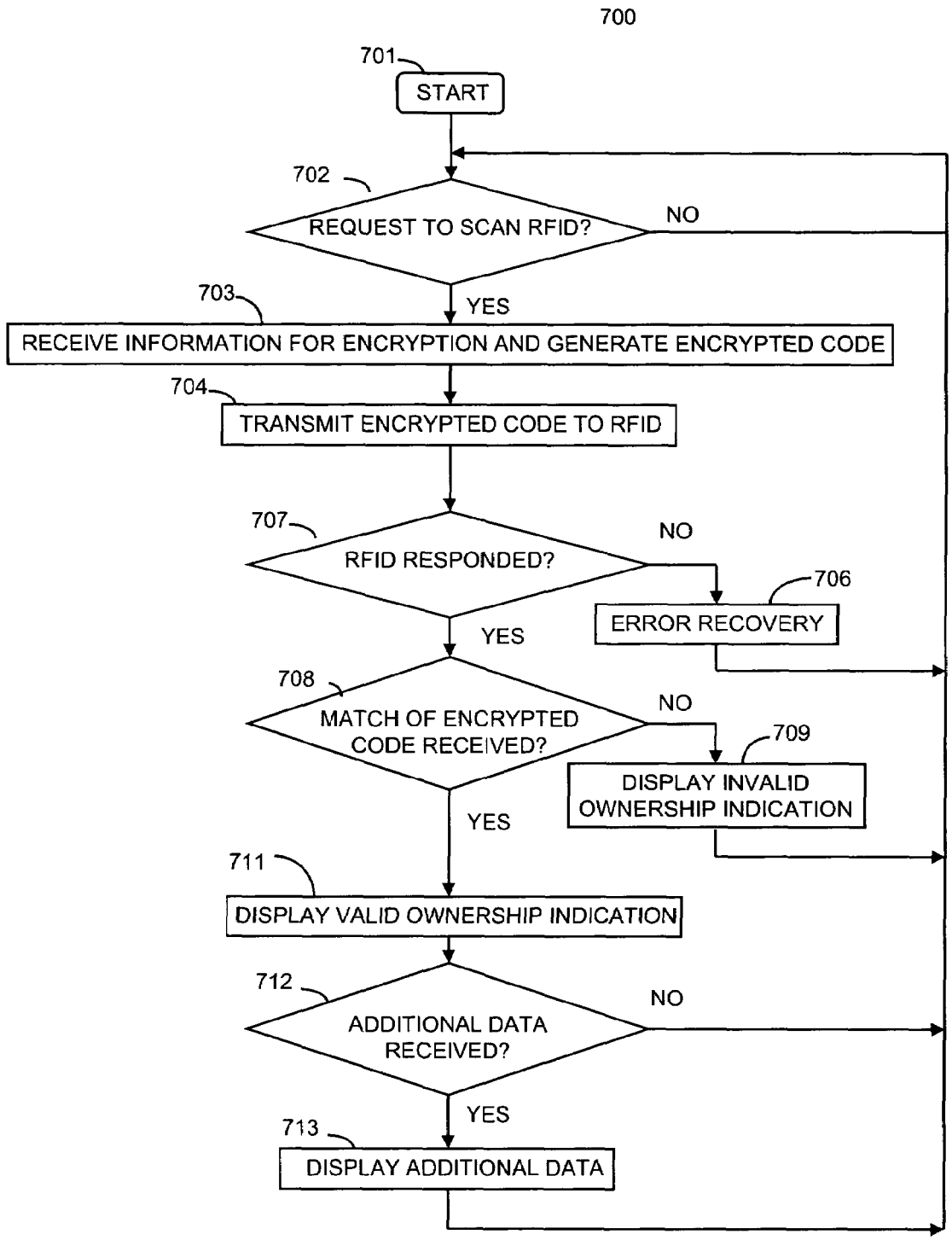
FIG. 7 illustrates, in flowchart form, operations performed by a security reader of the embodiment illustrated in FIG. 2.

FIG. 7 illustrates operations 700 performed by an embodiment of the security reader of FIG. 2. After being started in block 701, decision block 702 determines if a request to scan an RFID is being received from the input device. If the answer is no, control is transferred back to decision block 702. If the answer is yes in decision block 702, block 703 receives the information that will be used as the key for generating the encrypted code. This information is received from the input device.

Next, decision block 704 transmits the encrypted code to the RFID. Note, that after receiving the information, block 703 generates the encrypted code. After execution of block 704, control is transferred to decision block 707. Block 707 determines if the RFID has responded. If the answer is no, decision block 706 performs error recovery before transferring control back to decision block 702. If the answer is yes in decision block 707, control is transferred to decision block 708.

Decision block 708 determines if a match signal has been received back from the RFID for the encrypted code that was transmitted to the RFID. If the answer is no, control is transferred to block 709 which displays an invalid ownership indication before transferring control back to decision block 702. If the answer is yes in decision block 708, block 711 displays a valid ownership indication. Decision block 712 then determines if there was additional data received from the RFID in response to the transmitted encrypted code. If the answer is yes, block 713 displays this additional data before transferring control back to decision block 702. If the answer is no in decision block 712, control is transferred back to decision block 702.

Figure 8:
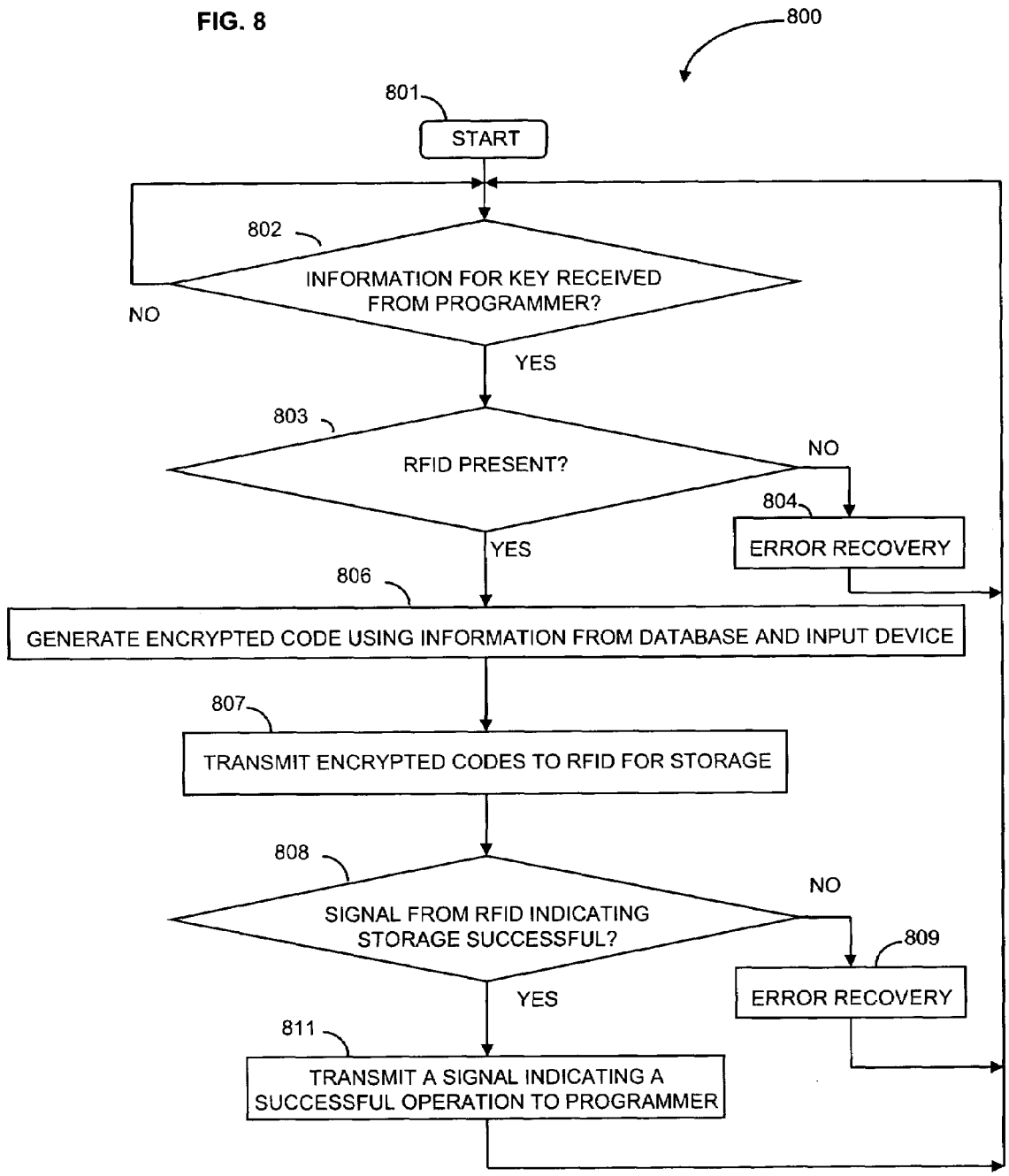
FIG. 8 illustrates, in flowchart form, operations performed by a programmer of the embodiment illustrated in FIG. 3.

FIG. 8 illustrates operations 800 that are performed by one embodiment of a programmer of FIG. 3. After being started in block 801, decision block 802 determines if a key has been received for encrypting a code to be stored in a RFID from the programmer. Note, that there may be additional commands to instigate the operations of the programmer. If the answer is no, control is transferred back to decision block 802. If the answer is yes, decision block 803 determines if there is a RFID present into which an encrypted code can be stored. If the answer is no, block 804 performs error recovery before transferring control back to decision block 802.

If the answer is yes in decision block 803, block 806 generates the encrypted code from the key received from the programmer, and block 807 transmits the encrypted code to the RFID for storage before transferring control to decision block 808.

Decision block 808 determines if a signal has been received from the RFID indicating that the storage of the encrypted code was successful. Note, that more than one encrypted code may be generated and transmitted for storage in the RFID. Decision block 808 determines if all of the encrypted codes have been stored successfully. If the answer in decision block 808 is no, block 809 performs error recovery before transmitting control back to decision block 802. If the answer in decision block 808 is yes, block 811 transmits a signal indicating a successful operation to the programmer before transferring control back to decision block 802.

Figure 9:
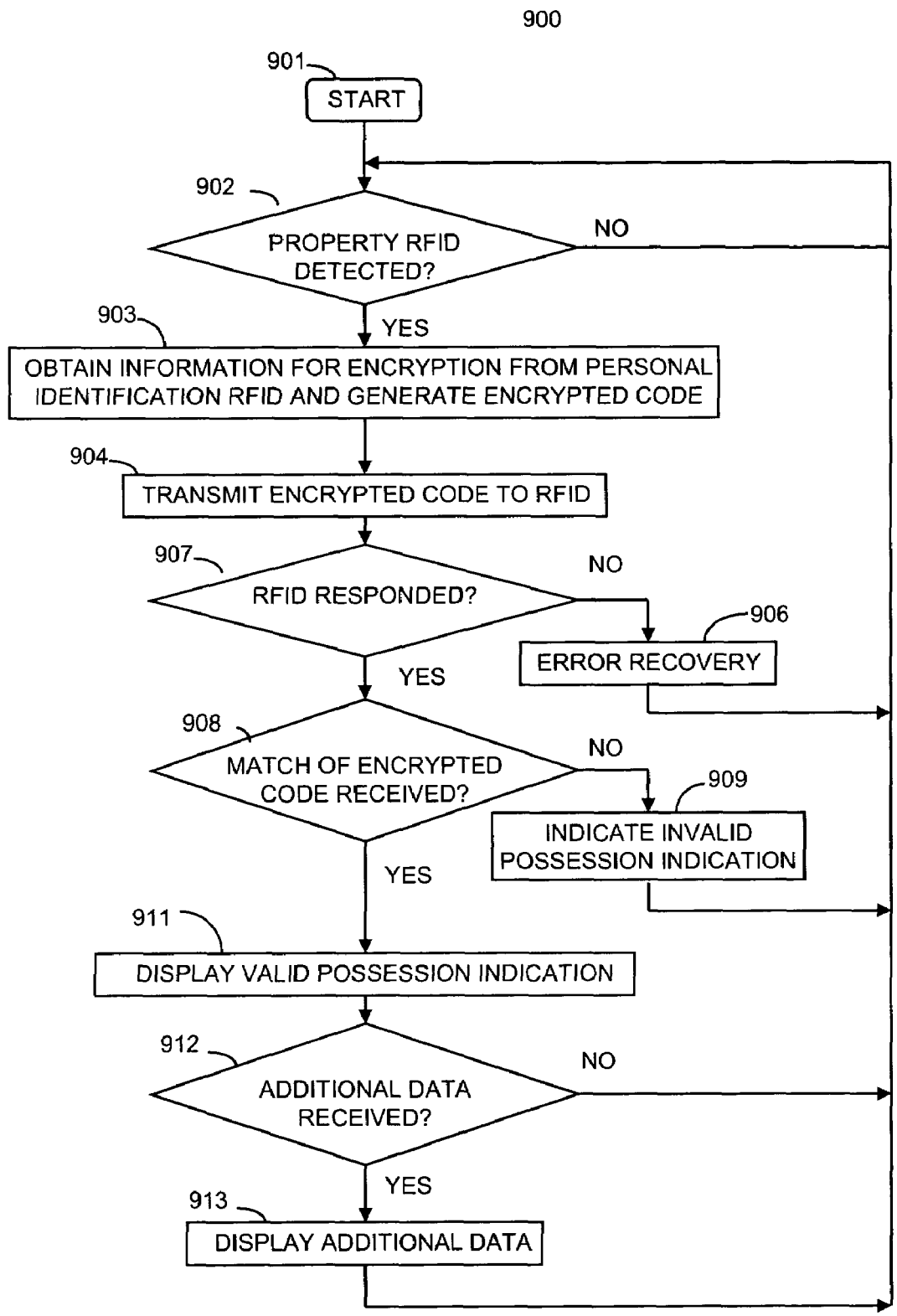
FIG. 9 illustrates, in flowchart form, operations performed by the security reader of the embodiment illustrated in FIG. 4.

FIG. 9 illustrates operations 900 performed by an embodiment of the security reader of FIG. 4. After being started in block 901, decision block 902 determines if a property RFID has been detected. If the answer is no, control is transferred back to decision block 902. If the answer is yes in decision block 902, block 903 may receive the information from database 309, input device 311 or personal identification RFID 403 that will be used as the key for generating the encrypted code. This information is received from the input device or by programmer accessing the personal identification RFID.

Next, decision block 904 transmits the encrypted code to the RFID. Note, that after receiving the information, block 903 generates the encrypted code. After execution of block 904, control is transferred to decision block 907. Block 907 determines if the RFID has responded. If the answer is no, decision block 906 performs error recovery before transferring control back to decision block 902. If the answer is yes in decision block 907, control is transferred to decision block 908.

Decision block 908 determines if a match signal has been received back from the RFID for the encrypted code that was transmitted to the RFID. If the answer is no, control is transferred to block 909 which may sound an alarm or/and lock the exit before transferring control back to decision block 902. If the answer is yes in decision block 908, block 911 will allow the item to be taken off the premise. Decision block 912 then determines if there was additional data received from the RFID in response to the transmitted encrypted code. If the answer is yes, block 913 displays this additional data before transferring control back to decision block 902. If the answer is no in decision block 912, control is transferred back to decision block 902.

When the operations of the stations, servers, or systems are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The stations, servers, or systems can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where the stations, servers, or systems is implemented in hardware, the stations, servers, or systems can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for identifying valid possession of an item, comprising:
    attaching a radio frequency identification device to the item;
    obtaining encryption information defining an individual who can possess the item;
    generating an encrypted code from the encryption information by a programmer;
    inserting the encrypted code into the radio frequency identification device by the programmer whereas the encrypted code may be one of a plurality of encrypted codes;
    detecting a presence of the item by detection of the radio frequency identification device by a security reader;
    accessing by the security reader the encryption information from a personal identification radio frequency identification device carried by the individual and generating another encrypted code by the security reader using the obtained encryption information;
    attempting to access the radio frequency identification device by the security reader by transmission of the other encrypted code to the radio frequency identification device;
    responding with a correct access signal by the radio frequency identification device in response to receipt of the other encrypted code if the other encrypted code is same as the inserted encrypted code; and
    displaying a valid possession indication by the security reader upon receiving a correct address signal from the radio frequency identification device.

2. The method of claim 1 wherein the inserting comprises storing private information in the radio frequency identification device.

3. The method of claim 2 wherein the responding comprises transmitting warranty information that is stored as the private information by the radio frequency identification device in response to correct receipt of the inserted encrypted code in the form of the other encrypted code.

4. The method of claim 2 wherein the inserting further comprises allowing re-storing of the private information at a later time in response to correct receipt of the inserted encrypted code in the form of the other encrypted code.

5. The method of claim 4 further comprises protecting ownership stored in the warranty information that is stored as the private information from being re-stored.

6. The method of claim 1 wherein he encryption information is least one of birth date, social security number, identification number, credit card number, debt card number, or address.

7. The method of claim 1 wherein the attempting to access comprises receiving information corresponding to the encryption information;
    generating the other encrypted code; and
    transmitting the other encrypted code to the radio frequency identification device.

8. The method of claim 1 wherein the responding comprises receiving access information;
    determining if the received access information is the same as the inserted encrypted code; and
    transmitting the correct access signal if the determination is affirmative.

9. The method of claim 8 further comprises transmitting in response to a negative determination at least one of no response, public information stored in radio frequency identification device, or incorrect information.

10. A computer-readable medium for identifying valid possession of identifying an item, comprising computer-executable instructions configured for:
    attaching a radio frequency identification device to the item;
    obtaining encryption information defining an individual who can possess the item;
    generating an encrypted code from the encryption information by a programmer;
    inserting the encrypted code into the radio frequency identification device by the programmer whereas the encrypted code may be one of a plurality of encrypted codes;
    detecting a presence of the item by detection of the radio frequency identification device by a security reader;
    accessing by the security reader the encryption information from a personal identification radio frequency identification device carried by the individual and generating another encrypted code by the security reader using the obtained encryption information;
    attempting to access the radio frequency identification device by the security reader by transmission of the other encrypted code to the radio frequency identification device;
    responding with a correct access signal by the radio frequency identification device in response to receipt of the other encrypted code if the other encrypted code is same as the inserted encrypted code; and
    displaying a valid possession indication by the security reader upon receiving a correct address signal from the radio frequency identification device.

11. The computer-readable medium of claim 10 wherein the computer-executable instructions for inserting comprise computer-executable instructions for storing private information in the radio frequency identification device.

12. The computer-readable medium of claim 11 wherein the computer-executable instructions for responding comprise computer-executable instructions for transmitting warranty information that is stored as the private information by the radio frequency identification device in response to correct receipt of the inserted encrypted code in the form of the other encrypted code.

13. The computer-readable medium of claim 11 wherein the computer-executable instructions for inserting further computer-executable instructions for allowing re-storing of the private information at a later time in response to correct receipt of the inserted encrypted code in the form of the other encrypted code.

14. The computer-readable medium of claim 13 further comprise computer-executable instructions for protecting ownership stored in the warranty information that is stored as the private information from being re-stored.

15. The computer-readable medium of claim 10 wherein the encryption information is least one of birth date, social security number, identification number, credit card number, debt card number, or address.

16. The computer-readable medium of claim 10 wherein the computer-executable instructions for attempting to access comprise computer-executable instructions for receiving information corresponding to the encryption information;
   generating the other encrypted code; and
   transmitting the other encrypted code to the radio frequency identification device.

17. The computer-readable medium of claim 10 wherein the computer-executable instructions for responding comprise computer-executable instructions for receiving access information;
   determining if the received access information is the same as the inserted encrypted code; and
   transmitting the correct access signal if the determination is affirmative.

18. The computer-readable medium of claim 17 further comprise computer-executable instructions for transmitting in response to a negative determination at least one of no response, public information stored in radio frequency identification device, or incorrect information.

* * * * *